United States Patent [19]

Cemenska et al.

[11] 4,295,449
[45] Oct. 20, 1981

[54] ROTARY FUEL INJECTION WITH SEQUENCING

[75] Inventors: Richard A. Cemenska, Edelstein; George B. Grim, Washington, both of Ill.

[73] Assignee: Caterpillar Tractor Co., Peoria, Ill.

[21] Appl. No.: 99,137

[22] PCT Filed: Sep. 24, 1979

[86] PCT No.: PCT/US79/00762

§ 371 Date: Sep. 24, 1979

§ 102(e) Date: Sep. 24, 1979

[87] PCT Pub. No.: WO81/00884

PCT Pub. Date: Apr. 2, 1981

[51] Int. Cl.³ .............................................. F02M 41/06
[52] U.S. Cl. .................................... 123/300; 123/450
[58] Field of Search ........................... 239/66, 88–95, 239/124, 443, 444, 446, 533.3–533.5, 569, 581, 582, 584; 123/294, 299, 300, 448, 450, 458, 472, 478, 490, 451

[56] References Cited

U.S. PATENT DOCUMENTS

| | | | |
|---|---|---|---|
| 2,356,627 | 8/1944 | Skaredoff | 417/269 |
| 2,729,167 | 1/1956 | Links | 123/450 X |
| 2,871,796 | 2/1959 | Dreisin et al. | 239/88 X |
| 2,974,657 | 3/1961 | Bessiere | 123/450 X |
| 3,068,793 | 12/1962 | Morris | 123/448 X |
| 3,090,369 | 5/1963 | Corlew | 123/450 |
| 3,348,488 | 10/1967 | Wolff | 123/490 X |
| 3,851,635 | 12/1974 | Murtin et al. | 123/458 X |
| 3,891,151 | 6/1975 | Showalter | 239/533.5 |
| 3,894,518 | 7/1975 | Gavrun et al. | 123/299 X |
| 4,129,253 | 12/1978 | Bader, Jr. et al. | 239/88 |
| 4,132,201 | 1/1979 | Bart | 123/451 X |

FOREIGN PATENT DOCUMENTS

| | | |
|---|---|---|
| 914080 | 6/1954 | Fed. Rep. of Germany . |
| 1917927 | 10/1970 | Fed. Rep. of Germany . |
| 2211598 | 7/1974 | France . |
| 295967 | 8/1928 | United Kingdom . |

Primary Examiner—Johnny D. Cherry
Attorney, Agent, or Firm—Phillips, Moore, Weissenberger, Lempio & Majestic

[57] ABSTRACT

Two fully independent fuel injection systems have been used for delivering pilot and main fuel injection. Also, two fuel pumps have been used to provide pilot and main injection through a single nozzle. A fuel injection apparatus now provides a plurality of rotary valves (46,48) for starting and stopping both pilot and main injection. Fuel is sequentially (26) controlled to be pilot injected through a first nozzle (28) and main injected through a second nozzle (30).

22 Claims, 10 Drawing Figures

ROTARY FUEL INJECTION WITH SEQUENCING

DESCRIPTION

Technical Field

This invention relates generally to internal combustion engines and more particularly to those having electrically controlled fuel injection.

Background Art

Electrical control of fuel injection is versatile and thus advantageous. In general, it allows accomplishment of several important objectives such as excellent control of exhaust emissions; improved engine response; programming of desired torque characteristics of the engine; programming of desired speed regulations; provision for rapid shutdown of engines; and improved fuel economy.

Conventionally, when it is desired to provide pilot injection, two fully independent fuel injection systems have been used. Thus, expense and bulk are limitations of pilot injection accomplished this way.

A rotary controlled fuel injection apparatus has been provided with dual rotary controlled valves for controlling the amount of fuel injected into an engine which reduced inertial forces associated with prior art valves used for fuel injection. Where only one injector nozzle is used, dual rotary valves can provide control of both pilot and main fuel injection. However, a limitation of dual rotary controlled fuel injection is that it has not been applied in situations where pilot injection is done through one nozzle and the main injection is delivered through another nozzle.

The foregoing illustrates limitations of the known prior art. Thus, it is apparent that it would be advantageous to provide an alternative to the prior art. Accordingly, the present invention is directed to overcoming one or more of the limitations as set forth above.

Disclosure of Invention

In one aspect of this invention a fuel injection apparatus comprises a plunger reciprocably mounted in a plunger bore to define a pumping cavity therein, means for starting and stopping pilot injection and main injection of the fuel by alternately permitting pressurization and venting of said pumping cavity, including a plurality of continuously rotating valves connected to the pumping cavity, first and second nozzles, and means for sequentially directing the fuel from the pumping cavity to the first and second nozzles for controlling said pilot injection through said first nozzle and main injection through said second nozzle.

In another aspect of this invention the fuel injection apparatus comprises first and second nozzles, means for delivering fuel to a conduit, first means for sequentially directing the fuel from the conduit to the first nozzle along a first path and then from the conduit to the second nozzle along a second path, second means for starting and stopping the flow of fuel to the first nozzle with the second means being in fluid communication with the first path, and third means for starting and stopping the flow of fuel to the second nozzle with the third means being in fluid communication with the second path.

The foregoing and other aspects will become apparent from the following detailed description of the invention when considered in conjunction with the accompanying drawings. It is to be expressly understood, however, that the drawings are not intended as a definition of the invention but are for the purpose of illustration only.

Best Mode For Carrying Out The Invention

Figure 1:
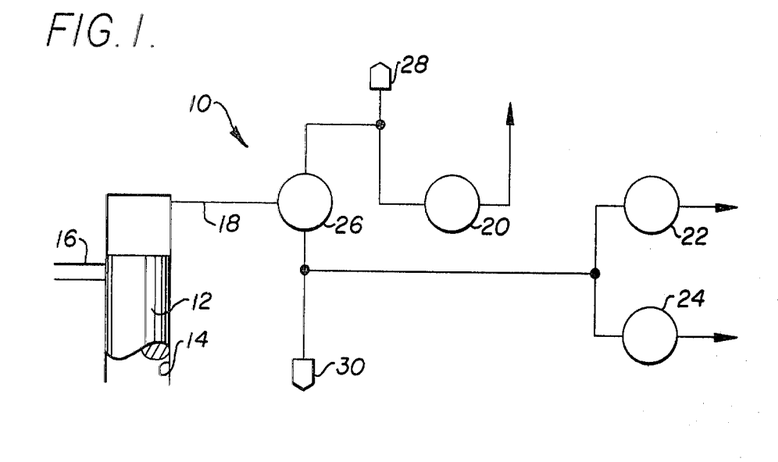
FIG. 1 is a diagrammatic view of a fuel injection apparatus.

In FIG. 1 a fuel injection apparatus 10 includes a plunger 12 reciprocably mounted in a plunger bore 14. Means 16,18 are provided for conducting fuel to and from plunger bore 14. Means 20,22,24 are provided for cooperatively starting and stopping pilot injection and main injection of fuel. In addition, means 26 sequentially directs fuel from plunger bore 14 for pilot injection through a first nozzle 28 and for main injection through a second nozzle 30.

Figure 2:
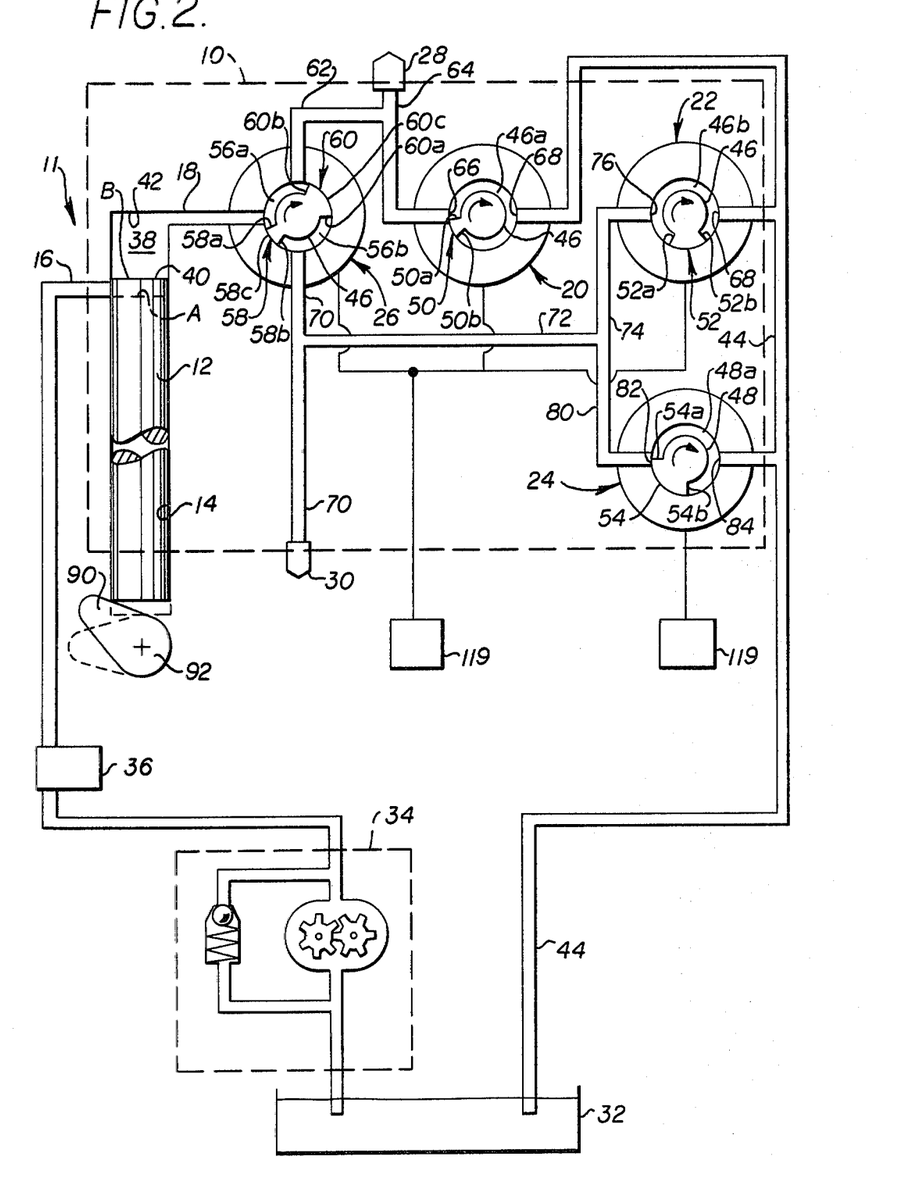
FIG. 2 is a diagrammatic view illustrating the fuel injection apparatus in greater detail and embodied in a system.

In FIG. 2, fuel injection apparatus 10 is operatively connected in a system 11 including a known fuel supply tank or reservoir 32 from which fuel is transferred, via conduit 16, to plunger bore 14 by a well known fuel transfer pump 34, preferably through a filter 36. When plunger 12 is in a dotted line position designated "A", fuel enters a cavity 38 formed in bore 14 between an end 40 of plunger 12 and an end 42 of bore 14. The fuel is then conducted from cavity 38 by conduit 18. Ultimately, fuel in system 11 returns to reservoir 32 via a conduit 44.

A first valve 46 rotates clockwise in a bore 47. Similarly a second valve 48 rotates clockwise in a bore 49 (see FIGS. 2, 3 and 4). Means 26, FIG. 2, is illustrated in sectional view A—A of FIG. 3 and includes a groove 56 formed on first valve 46 for sequentially directing fuel. Means 20, FIG. 2, is illustrated in sectional view B—B of FIG. 3 and includes a blocking shoulder 50 of first valve 46 for starting and stopping pilot injection through nozzle 28. Means 22, FIG. 2, is illustrated in sectional view C—C of FIG. 3 and includes a blocking shoulder 52 of first valve 46 for starting main injection through nozzle 30. Means 24, FIG. 2, is illustrated in sectional view D—D of FIG. 4 and includes a blocking shoulder 54 of second valve 48 for stopping main injection through nozzle 30.

Figure 3:
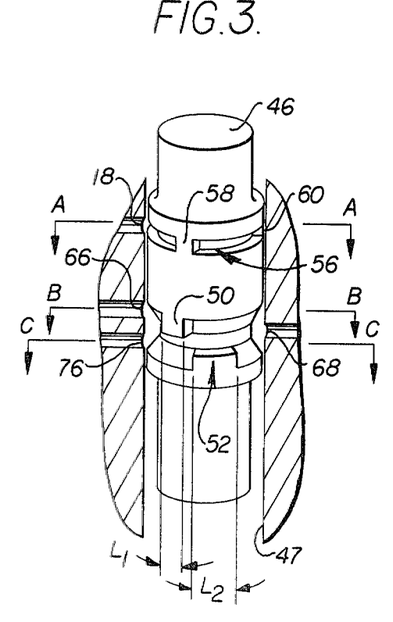
FIG. 3 is an isometric view partially illustrating one rotary valve.
Figure 4:
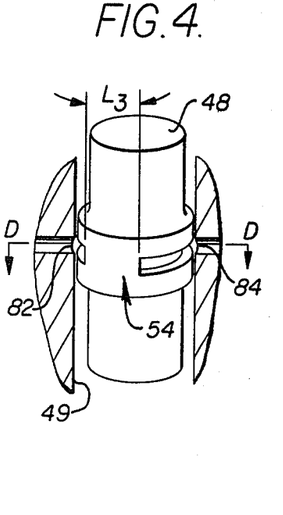
FIG. 4 is an isometric view partially illustrating another rotary valve.

More specifically, groove 56 includes a portion 56a, FIG. 2, partitioned from a portion 56b by blocking shoulders 58,60. Shoulder 58 includes a leading edge 58a, a trailing edge 58b, and an arcuate face 58c. Arcuate face 58c is at least large enough to momentarily close off conduit 18 so as to avoid unduly high pressure buildup in system 11. However, if desired, a relief valve can be provided on plunger 12 to relieve such unduly high pressure. Shoulder 60 includes a leading edge 60a, a trailing edge 60b and an arcuate face 60c. Thus, portion 56a of groove 56 is formed in bore 47 between leading edge 58a and trailing edge 60b. Portion 56b of groove 56 is formed between leading edge 60a and trailing edge 58b. Portion 56a, as illustrated in FIG. 2, is of a size sufficient to permit fluid communication between conduit 18 and a conduit 62. Conduit 62 joins a conduit 64 which fluidly connects blocking shoulder 50 of valve 46 and first nozzle 28. As illustrated in FIGS. 2 and 3, blocking shoulder 50 is of a first size L1, sufficient for starting and stopping pilot injection by blocking a fill port 66 of conduit 64. L1 is the arcuate distance between a leading edge 50a and a trailing edge 50b of shoulder 50. A spill port 68 fluidly connects a groove 46a of valve 46 with conduit 44.

Portion 56b, as illustrated in FIG. 2, is of a size sufficient to permit fluid communication between conduit 18 and a conduit 70. Conduit 70 joins a pair of conduits 72,74 which fluidly connect blocking shoulder 52 of valve 46 and second nozzle 30. As illustrated in FIGS. 2 and 3, blocking shoulder 52 is of a second size L2, greater than L1, sufficient for starting main injection by blocking a fill port 76. L2 is the arcuate distance between a leading edge 52a and a trailing edge 52b of shoulder 52. Spill port 68 also fluidly connects a groove 46b of valve 46 with conduit 44.

Conduit 70 also joins a pair of conduits 72,80 which fluidly connect blocking shoulder 54 and second nozzle 30. As illustrated in FIGS. 2 and 3, blocking shoulder 54 is of a third size L3, greater than L1 and L2, for stopping main injection when shoulder 54 stops blocking a fill port 82. L3 is the arcuate distance between a leading edge 54a and a trailing edge 54b of shoulder 54. It should be noted, as will be later pointed out in greater detail, that it is preferred that L3 is of a size sufficient to block fill port 82 during both pilot and main injection. A spill port 84 fluidly connects a groove 48a of valve 48 with conduit 44.

Fuel can be expelled through either nozzle 28 or 30 due to substantial pressurization of the fuel in cavity 38, FIG. 2. Conventionally, it is well known that plunger 12 is resiliently biased by a spring (not shown) and driven by a lobe 90 on a camshaft 92. As a result, plunger 12 reciprocates in bore 14. Fuel is expelled through ports (not shown) in nozzles 28,30 due to substantial pressurization of the fuel in cavity 38 of bore 14 as plunger 12 reciprocates. Controlling the quantity and timing of fuel injection through nozzles 28,30 is the subject of much technology due to present trends in enhancing fuel economy and reducing fuel emissions. Such technology is complicated because the control of quantity and timing must be coordinated with other engine functions and conditions. Since the lobe 90 and plunger 12 have a fixed cyclical relationship for pressurizing the fuel in bore 14, variations in controlling quantity and timing of injection usually involve electrical and/or mechanical control of the admittance of fuel to bore 14. For example, this has been conventionally accomplished by a scroll (helix) on the plunger which is rotated with a rack. As illustrated, in FIG. 2, plunger 12 reciprocating between the dotted line position "A" and a solid line position "B" permits cavity 38 to fill with fuel. Once plunger 12 closes off fluid communication between conduit 16 and cavity 38, fuel will be compressed in cavity 38 as plunger 12 continues toward end 42 and will be expelled through either nozzle 28 or 30 depending on the sequencing position of groove 56. However, compression of fuel in cavity 38 and expelling the fuel through the nozzles also depends on whether the fuel has access to return conduit 44 or is blocked by blocking shoulders 50,52,54.

As an example, FIG. 2 illustrates conduit 16 closed off by plunger 12. Portion 56a permits fluid in cavity 38 to be directed toward first nozzle 28. However, since shoulder 50 does not block port 66, fuel returns to reservoir 32 via conduit 44. Shoulders 58,60 of valve 46 limit fuel access to nozzle 30. Thus, due to insufficiently high pressure, no injection can occur under the circumstances illustrated in FIG. 2.

Figure 5:
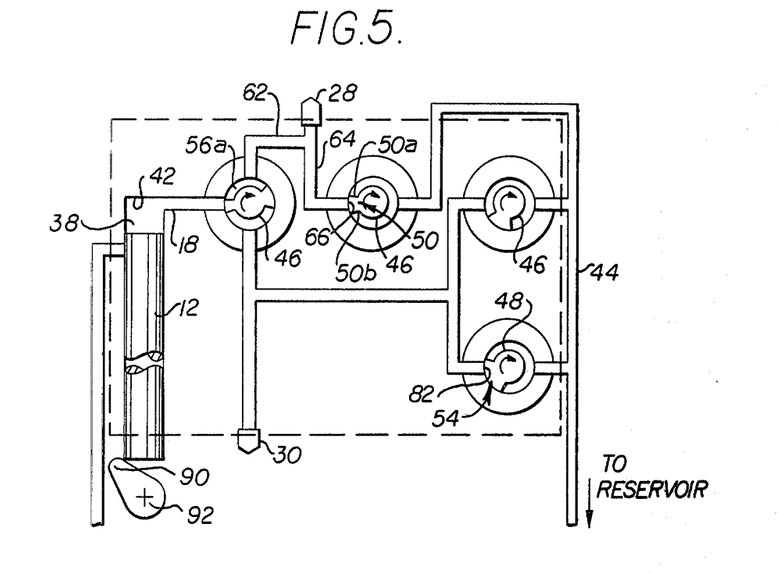
FIGS. 5, 6, 7 and 8 are views illustrating sequential steps of rotary controlled fuel injection with sequencing.

In FIG. 5, valves 46 and 48 are illustrated as rotated clockwise from their positions illustrated in FIG. 2 and plunger 12 has moved closer to end 42 thus reducing volume and increasing pressure in cavity 38. Portion 56a still permits fluid in cavity 38 to be directed toward nozzle 28 and fuel access to nozzle 30 is limited. Edge 50a rotates past fill port 66 so that shoulder 50 blocks port 66 and thus fuel is trapped in cavity 38, conduit 18, portion 56a, conduit 62 and conduit 64. As a result, high pressure fuel is pilot injected through nozzle 28 until, upon further clockwise rotation of valve 46, edge 50b of shoulder 50 rotates past port 66 permitting fuel to return to reservoir 32 via conduit 44 thus ending pilot injection. In this manner, portion 56a sequences fuel to start and stop pilot injection. Note that under the conditions described above, shoulder 54 also blocks port 82 during pilot injection. Although fuel is being sequenced to nozzle 28, it is preferred that shoulder 54 block port 82 during pilot injection for the following reasons: first, this permits dimensional flexibility and thus reduces cost; and second, the size of shoulder 54 beneficially limits leakage of fuel past shoulder 54.

Figure 6:
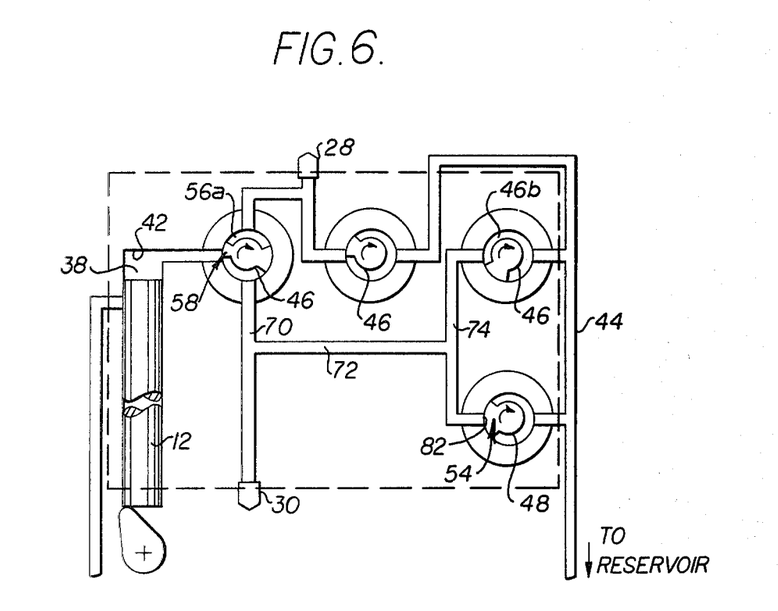

In FIG. 6, valves 46 and 48 are illustrated as rotated clockwise from their positions illustrated in FIG. 5 and plunger 12 has moved closer to end 42 thus the reducing volume of cavity 38. Due to rotation of shoulder 58, portion 56a now limits fluid access to nozzle 28 and permits fluid in cavity 38 to be directed toward nozzle 30. Pilot injection is ended. However, although shoulder 54 blocks port 82, insufficient pressure is available for main injections via nozzle 30 since fuel can spill through conduits 70,72,74 and past groove 46b and return to reservoir 32 via conduit 44.

Figure 7:
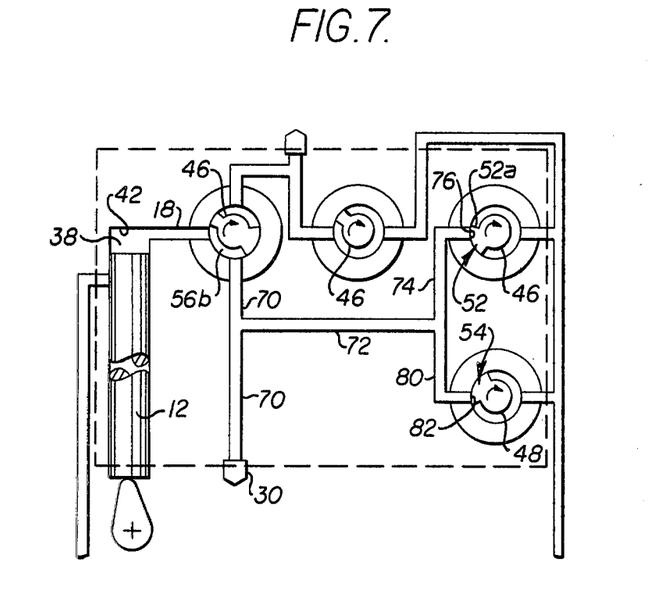

In FIG. 7, valves 46 and 48 are illustrated as rotated clockwise from their positions in FIG. 6 and plunger 12 has moved closer to end 42 thus further reducing volume and increasing pressure in cavity 38. Portion 56b continues to direct fuel toward nozzle 30 and shoulder 54 continues to block port 82. Edge 52a is now rotated to a position where shoulder 52 blocks port 76 to begin main injection through nozzle 30 due to sufficient high pressure buildup in cavity 38, conduit 18, portion 56b, and conduits 70,72,74 and 80. In this manner, portion 56b sequences fuel to start main injection.

Figure 8:
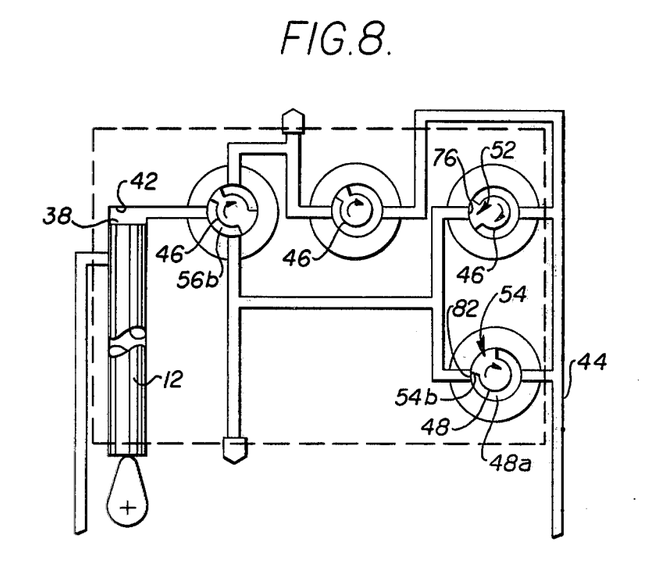

In FIG. 8, valves 46 and 48 are illustrated as rotated clockwise from their positions in FIG. 7 and plunger 12 has moved closer to end 42 thus reducing the volume of cavity 38. Portion 56b continues to direct fuel toward nozzle 30 and shoulder 52, which began main injection, still blocks port 76. However, edge 54b of shoulder 54 has rotated past port 82 thus ending main injection due to insufficient pressure by permitting fuel to pass through groove 48a and ultimately to reservoir 32 via conduit 44. In this manner, portion 56b sequences fuel to end main injection.

Figure 9:
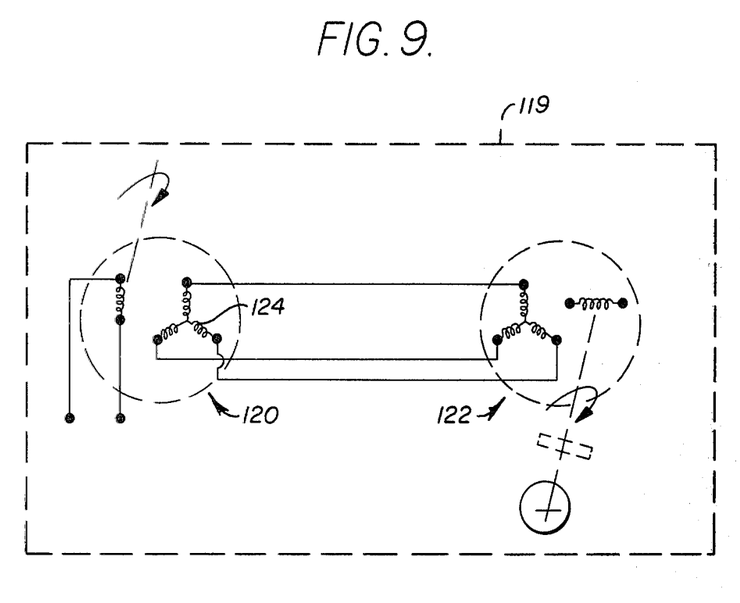
FIG. 9 is a diagrammatic view illustrating an adjustment control for use with the rotary valves.

Means are provided for continuously rotating valve 46 and an additional identical means is required to continuously rotate valve 48. However, only one of the identical means 119 is shown in FIGS. 2 and 9 and is described below. Means 119 is preferably electrical, although it is possible to arrange for mechanical rotation of valves 46,48. Means 119 includes a control transmitter 120, and a control transformer and servo 122. Control transmitter 120 is driven by camshaft 92 at one-half engine speed (for a 4 cycle engine). Such a control transmitter 120, through suitable buffering networks which are well known, energizes control transformer and servo 122, which rotates valve 46. By adjusting the position of stator 124 of control transmitter 120, the starting of main injection is controlled. This is accomplished by adjusting the timed positioning of shoulder 52 of valve 46 relative to camshaft 92 as to precisely when shoulder 52 begins to block port 76 thus controlling the starting of main injection. Since shoulders 50,52 have a fixed relationship on valve 46, the timed positioning of shoulder 50 is likewise adjusted.

In the additional identical means 119, the control transmitter, also driven by camshaft 92, directly drives control transformer and servo 122 for rotating valve 48. By adjusting stator 124 of control transmitter 120, the stopping of injection is controlled. This is accomplished by adjusting the timed positioning of shoulder 54 of valve 48 relative to shoulder 52 of valve 46 as to precisely when shoulder 54 stops blocking port 82 thus controlling the stopping of main injection. Electrical equipment for supplying the above-described functions of means 119 is available from commercial sources such as AEROFLEX and the SINGER INSTRUMENT COMPANY, both of the United States of America.

Another electrical means is possible for continuously rotating valves 46,48 and will be briefly discussed. Such means comprises a digital system, several types of which have been used successfully for various applications requiring precision drives with adjustable phase angles. Such a digital system may be obtained from stepping motors of the type commercially available from HAWKER-SIDDLEY DYNAMICS of Great Britain, but do not have provisions for feedback corrections. However, feedback loop equipment is commercially available from DISC INSTRUMENT CORP. of the United States of America.

Rotating the valves 46,48 at one-half engine speed will result in making one injection of fuel per two engine revolutions in a four cycle engine. A two cycle engine would have valves 46,48 rotating at crank speed since injection frequency is at crank frequency. The arcuate lengths L1, L2 and L3 of shoulders 50,52 and 54, respectively, may be expressed in rotational degrees. Thus, by controlling the position and dimensions L1, L2, of the blocking shoulders 50,52 relative to camshaft 92, the starting and stopping of pilot injection and the starting of main injection can be controlled, and, by controlling the position of shoulder 54 relative to shoulders 50,52, the stopping of main injection can be controlled.

Electrical means are employed to determine the start of injection as well as to determine the quantity of fuel injected. Such means are well known and are not the subject of this invention. These means usually include a power source, sensing devices, actuators, and the like, and take into account inlet manifold pressure and temperature, engine speed and load, and even fuel temperature.

A well known logic system, for example, the universal fuel injection system, UFIS, developed for the military for use in track type or armored vehicles, may be used for actuating a fuel pump control system. The UFIS reads and interprets vehicle data such as engine speed, boost or manifold pressure, engine temperature, ambient temperature, altitude, load, etc. The UFIS is powered by the vehicular power system, e.g., a twelve (12) or twenty-four (24) volt system or the like. The UFIS logic requires relatively low milliamperage. Thus, the signal produced by the UFIS logic must be amplified to provide an appropriate UFIS input to control transmitter 120. UFIS type logic can also provide the appropriate adjustment to stator 124 for controlling the position of shoulders 50,52, relative to camshaft 92 and the position of shoulder 54 relative to shoulders 50,52 as discussed above.

Figure 10:
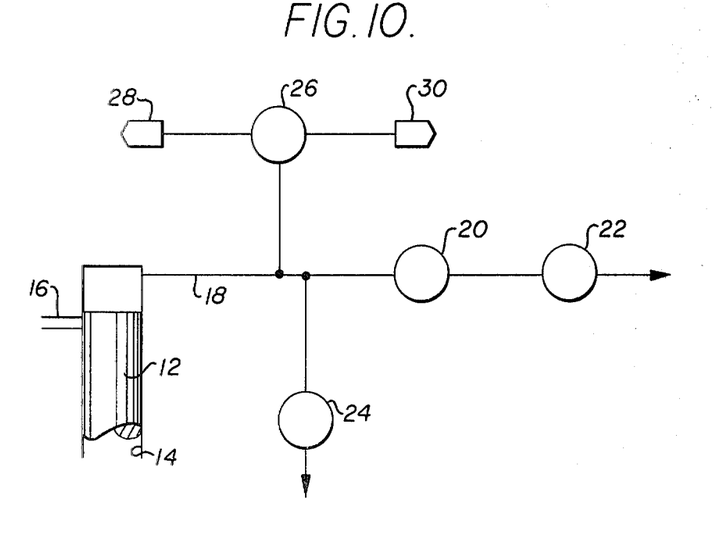
FIG. 10 is a diagrammatic view of another embodiment.

FIG. 10 is provided to illustrate the possibility of alternatives without departing from the scope of the present invention as described above.

Industrial Applicability

This apparatus is applicable to unit injectors, to conventional fuel pumps where several plungers are assembled in one unit (one such plunger per engine cylinder) or to unit pump systems where individual pumps are located in the vicinity of the cylinders they are serving. If applied to unit injectors, another high pressure line must lead from the unit injector to a second (either the main or the pilot) nozzle.

Thus, the apparatus provides using rotating control valves and a single reciprocating plunger per engine cylinder for controlling the injection of pilot fuel at a first nozzle, followed by the main fuel injection at a second nozzle, as well as providing variable timing control.

Preferably, two rotary valves are used. The first rotor sequences the fuel so that blocking shoulders on the first rotor control fuel spill flow to start and stop pilot injection through the first nozzle and to start main injection through the second nozzle. The first rotor also sequences the fuel to the first and second nozzles and a blocking shoulder on the second rotor controls fuel spill flow to stop the main injection. Both rotors operate at half engine speed on four cycle engines and at engine speed on two cycle engines.

The rotors are rotated and controlled electrically. By adjusting the phase angle between the rotors the quantity of fuel in the main injection is controlled. By simultaneously retarding the rotors, timing is retarded without altering the quantity of fuel injected. By advancing the rotors, timing is advanced without altering the quantity of fuel injected.

In providing for the use of two separate nozzles, pilot injection can be made into a small precombustion chamber, while main injection is made into the main chamber, thus enhancing the advantages of both prechambered and direct injection type diesel engines.

The foregoing has described a rotary fuel injection apparatus and system having a plurality of valves for starting and stopping both pilot and main fuel injection. Fuel is sequentially directed to the valves for pilot injection through a first nozzle and main injection through a second nozzle.

It is anticipated that aspects of the present invention, other than those specifically defined in the appended claims, can be obtained from the foregoing description and the drawings.

We claim:

1. A fuel injection apparatus comprising:

a plunger (12) reciprocably mounted in a plunger bore (14) to define a pumping cavity (38) therein;

means (20,22,24) for starting and stopping pilot injection and main injection of said fuel by alternately permitting pressurization and venting of said pumping cavity (38), said means for starting and stopping including a plurality of continuously rotating valves (46,48), said valves being fluidly connected to the pumping cavity (38) defined in said plunger bore (14);

a first nozzle (28);

a second nozzle (30); and (means (26) for sequentially directing said fuel from the pumping cavity (38) of said plunger bore to said first and second nozzles (28,30) for controlling said pilot injection through said first nozzle (28) and main injection through said second nozzle (30).

2. The apparatus of claim 1 wherein said means for starting and stopping includes first (46) and second (48) valves.

3. The apparatus of claim 2 wherein said first valve (46) starts and stops said pilot injection, and starts said main injection.

4. The apparatus of claim 3 wherein said second valve (48) stops said main injection.

5. The apparatus of claim 4 wherein said first valve (46) includes said means (26) for directing said fuel.

6. The apparatus of claim 2 wherein said first valve (46) includes a first blocking shoulder (50), said first blocking shoulder (50) being of a first size (L1) for starting and stopping said pilot injection.

7. The apparatus of claim 6 wherein said first valve (46) includes a second blocking shoulder (52), said second shoulder (52) being of a second size (L2) greater than said first size (L1) for starting said main injection.

8. The apparatus of claim 7 wherein said second valve (48) includes a third blocking shoulder (54), said third shoulder (54) being of a third size (L3) greater than said first (L1) and second (L2) sizes for stopping said main injection.

9. The apparatus of claim 1 wherein one of said plurality of valves (46,48) includes a first valve (46) having means (20) for starting and stopping pilot injection and separate means (22) for starting main injection.

10. The apparatus of claim 9 wherein another of said plurality of valves (48) includes a second valve having means (24) for stopping main injection.

11. The apparatus of claim 10 wherein said means (26) for sequentially directing is fluidly connected to said means (20) for starting and stopping pilot injection.

12. The apparatus of claim 11 wherein said means (26) for sequentially directing is fluidly connected to said means (22) for starting main injection and to said means (24) for stopping main injection.

13. The apparatus of claim 12 wherein said means (26) for sequentially directing is a partitioned groove (56) on said first valve (46), said groove (56) having a first portion (56a) directing fuel to said means (20) for starting and stopping pilot injection and having a second portion (56b) directing fuel to said means (22) for starting main injection and to said means (24) for stopping main injection.

14. The apparatus of claim 1 wherein said plurality of valves (46,48) includes a first valve (46) having means (20) for starting and stopping pilot injection, means (22) for starting main injection and said means (26) for sequentially directing said fuel.

15. The apparatus of claim 14 wherein said plurality of valves (46,48) includes a second valve (48) having means (24) for stopping main injection.

16. A fuel injection apparatus comprising:

a plunger (12) reciprocably mounted in a plunger bore (14);

means (16,18) for conducting fuel to and from said plunger bore (14);

a first valve (46) connected for continuously rotating, said valve (46) having means (20) for starting and stopping pilot fuel injection by alternately permitting pressurization and venting of fuel in said plunger bore (14) and means (22) for starting main injection by permitting pressurization of fuel in said plunger bore (14);

a second valve (48) connected for continuously rotating, said valve (48) having means (24) for stopping main injection by permitting venting of fuel in said plunger bore (14);

said valves (46,48) being fluidly connected to said plunger bore (14); and means (26) for sequentially directing said fuel from said plunger bore (14) to either of (a) said means (20) for starting and stopping said pilot injection, or (b) said means (22) for starting said main injection and said means (24) for stopping main injection.

17. The apparatus of claim 16 wherein said first valve (46) includes said means (26) for sequentially directing said fuel.

18. The apparatus of claim 17, including:

means (119) for independently rotatably adjusting said first and second valves (46,48).

19. In a fuel injection apparatus of the type including first and second nozzles (28,30), a plunger (12) reciprocating in a plunger bore (14), conduit means (16,18) for conducting fuel to and from the bore (14), a plurality of valves (46,48) connected for continuous rotation for starting and stopping pilot and main fuel injection by alternately permitting pressurization and venting of fuel in said plunger bore (14), said valves (46,48) being fluidly interconnected and being fluidly connected to said plunger bore (14), the improvement comprising:

means (26) for sequentially directing said fuel from said plunger bore (14) to said first and second nozzles (28,30) and to said valves (46,48) for starting and stopping said pilot injection through said first nozzle (28) and for starting and stopping main injection through said second nozzle (30).

20. A fuel injection system comprising:

a plunger (12) reciprocably mounted in a plunger bore (14);

means (16,18), for conducting fuel to and from said plunger bore (14);

a fuel reservoir (32);

means (34) for pumping fuel from said reservoir (32) to said plunger bore (14);

means (20,22,24) for starting and stopping pilot injection and main injection of said fuel by alternately permitting pressurization and venting of fuel in said plunger bore (14), said means for starting and stopping including a plurality of valves (46,48) connected for continuous rotation, said valves (46,48) being fluidly connected to said plunger bore (14); and means (26) for sequentially directing said fuel from said plunger bore (14) to said means (20,22,24) for starting said pilot and main injection.

21. In a fuel injection apparatus (10) of the type having first and second nozzles (28,30) and means (12,14,16) for delivering fuel to a conduit (18), the improvement comprising:
- first means (26) for sequentially directing the fuel from the conduit (18) to said first nozzle (28) along a first path and then from the conduit (18) to said second nozzle (30) along a second path;
- second means (20) for starting and stopping the flow of fuel to said first nozzle (28), said second means (20) being in fluid communication with the first path; and
- third means (22,24) for starting and stopping the flow of fuel to said second nozzle (30), said third means (22,24) being in fluid communication with the second path.

22. In a fuel injection apparatus (10), having a source (32) of pilot and main fuels, first (28) and second (30) nozzles, pump means (11) for communicating pressurized pilot and main fuel to said first (28) and second (30) nozzles, first rotor means (20) for controlling the pressurization of pilot fuel in said pump means (11) to start and stop ejection of pilot fuel through said fuel nozzle (28) in response to continuous rotation of said first rotor means (20), and second rotor means (22,24) for controlling the pressurization of main fuel in said pump means (11) to start and stop ejection to main fuel through said second nozzle (30) in response to continuous rotation of said second rotor means (22,24), the improvement comprising:
- third rotor means (26) for sequentially and repeatedly (a) communicating pilot fuel from said pump means (11) to each of said first nozzle (28) and said first rotor means (20), and (b) communicating main fuel from said pump means (11) to each of said second nozzle (30) and said second rotor means (22,24), all in response to continuous rotation of said third rotor means (26).

* * * * *